Feb. 27, 1968          I. BOTNICK          3,370,609

PUSH-BUTTON MIXING VALVE

Filed Oct. 20, 1964          5 Sheets-Sheet 1

INVENTOR.
IRLIN BOTNICK
BY
*Sanford Schnurmacher*
ATTORNEY

Feb. 27, 1968  I. BOTNICK  3,370,609

PUSH-BUTTON MIXING VALVE

Filed Oct. 20, 1964  5 Sheets-Sheet 3

INVENTOR.
IRLIN BOTNICK
BY Sanford Schumacher
ATTORNEY.

Feb. 27, 1968     I. BOTNICK     3,370,609

PUSH-BUTTON MIXING VALVE

Filed Oct. 20, 1964     5 Sheets-Sheet 4

INVENTOR.
IRLIN BOTNICK
BY *Sanford Schnurmacher*
ATTORNEY

Feb. 27, 1968     I. BOTNICK     3,370,609

PUSH-BUTTON MIXING VALVE

Filed Oct. 20, 1964     5 Sheets-Sheet 3

INVENTOR.
IRLIN BOTNICK
BY
*Sanford Schnurmacher*
ATTORNEY.

United States Patent Office 3,370,609
Patented Feb. 27, 1968

1

3,370,609
PUSH-BUTTON MIXING VALVE
Irlin Botnick, 3155 Kersdale Road,
Pepper Pike, Ohio 44124
Filed Oct. 20, 1964, Ser. No. 405,121
11 Claims. (Cl. 137—607)

ABSTRACT OF THE DISCLOSURE

A valve, push-button operated for selective flow and mixture of two liquids, e.g., hot and cold water, comprising five coplanar parallel through-bores with respective push-button actuated sliding piston spool type valve members, successively for cold through three intermediate temperatures to hot water discharge; a discharge bore, a cold inlet bore and therebetween a hot inlet bore coplanar and respectively intersecting at right angles all, all except the hot, and all except the cold through-bores; ancillary partial bores between the intermediate through-bores with screw plugs to meter flow permitted along the cold and hot inlet bores from one through-bore to another; respective through-bore tapered enlargements between the hot inlet and discharge bores; each valve member O-ring-sealed to its through-bore outboard of the discharge and inlet bores, and having an O-ring-sealed flow regulating head blocking and then permitting increasing flow to the discharge bore with advance over the tapered enlargement, and having a further head or heads moveable into the blocking flow from the hot and/or cold inlet bores, until the flow regulating head has moved to an open position; and a common retaining plate for the valve members across the through-bores at one end.

---

This invention relates to valves and valve actuators, and particularly to a push-button mixing valve.

The primary object of the invention is to provide an improved, simplified and compact push-button actuated valve construction by means of which all types of gas, oil, water, or any liquid or combination of liquids, may be mixed and dispensed for domestic, industrial, or hospital use.

Another object is to provide a valve construction having a plurality of push-button actuated pistons controlling fluid flow which are in constant hydrostatic balance, so that they will remain stationary in any position, thereby providing finger-tip control of the volume of fluid delivered, without requiring that the buttons, or their associated pistons, be held in position by restraining devices or externally applied force.

Another object is to provide a mixing valve of the type stated having means associated with each valve piston whereby fluid of the same mixture and temperature is delivered each time a particular piston actuating button is moved between off and on positions.

A further object is to provide such a valve providing by movement of each piston between its full-off and full-on positions a flow, at the preset mixture and temperature, ranging from a trickle to the full flow capacity of the supply lines.

Another object is to provide a water mixing valve in which there is no bypassing of hot and cold water when the valve is shut off.

Another object is to provide a mixing valve of the type described in which any desired number of buttons and pistons may be combined to deliver as many different specific temperatures as required; one for each temperature.

Still another object is to provide a mixing valve which may be remotely located from its delivery spout, and

2 which may be either manually controlled, or electrically activated from a distance.

Another object is to provide a push-button activated mixing valve that is an improvement over that described in my copending United States Patent application bearing Serial No. 119,426, filed June 26, 1961, now Patent No. 3,192,952.

Another object is to provide a mixing valve of the character described wherein individual pistons may be removed, repaired, and replaced in their respective bores without the use of tools.

These and other objects of the invention will appear from the following specification and the accompanying drawings, wherein like parts are referred to and indicated by like reference numerals, and wherein.

Figure 1:
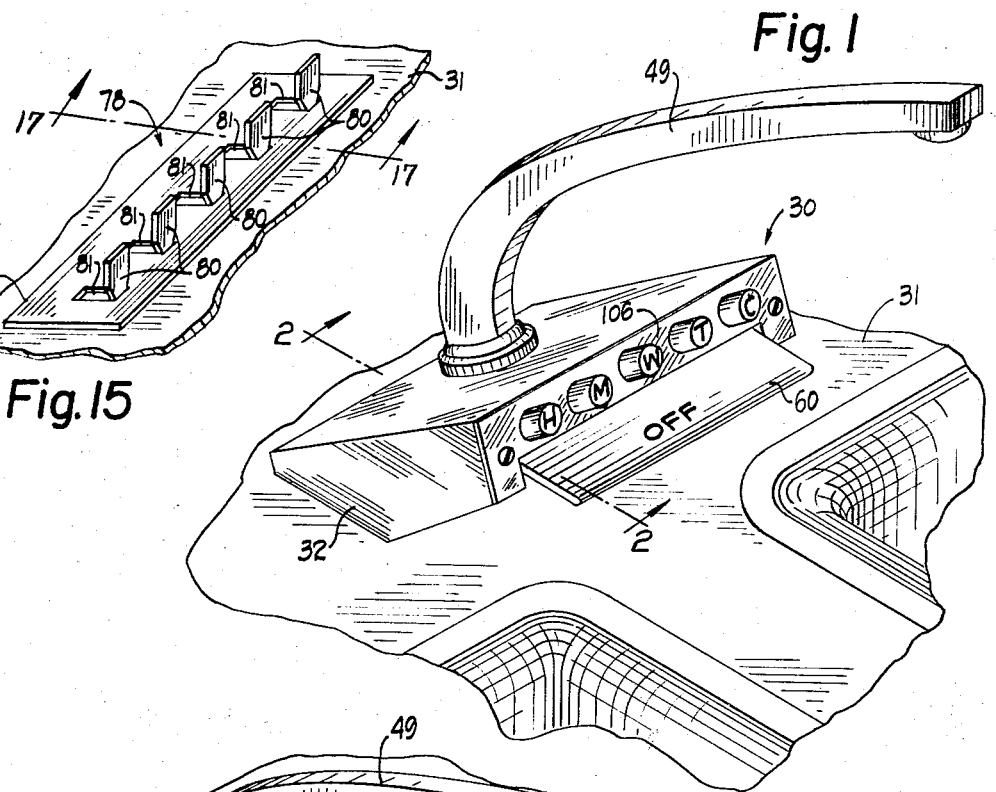
FIG. 1 is a perspective view of a push-button mixing valve embodying the present invention, showing it mounted on top of the back ledge of a divided sink.

Referring more particularly to the drawings, the push-button mixing valve that is the subject of this invention is broadly indicated in FIG. 1 by numeral 30. In this embodiment of the invention the valve, mounted on top of the rear section of a double sink 31, is enclosed in a downwardly open case 32 secured by a nut 43c on the protruding discharge nipple 43 to which, by coupling nut 43d and O-ring 48, is swively sealed the discharge faucet or spout 49, as is most clearly seen in FIG. 2, with the operating buttons H, M, W, T and C disposed at a convenient upwardly extending angle, and with the shut-off plate 60 immediately below the buttons.

Figure 14:
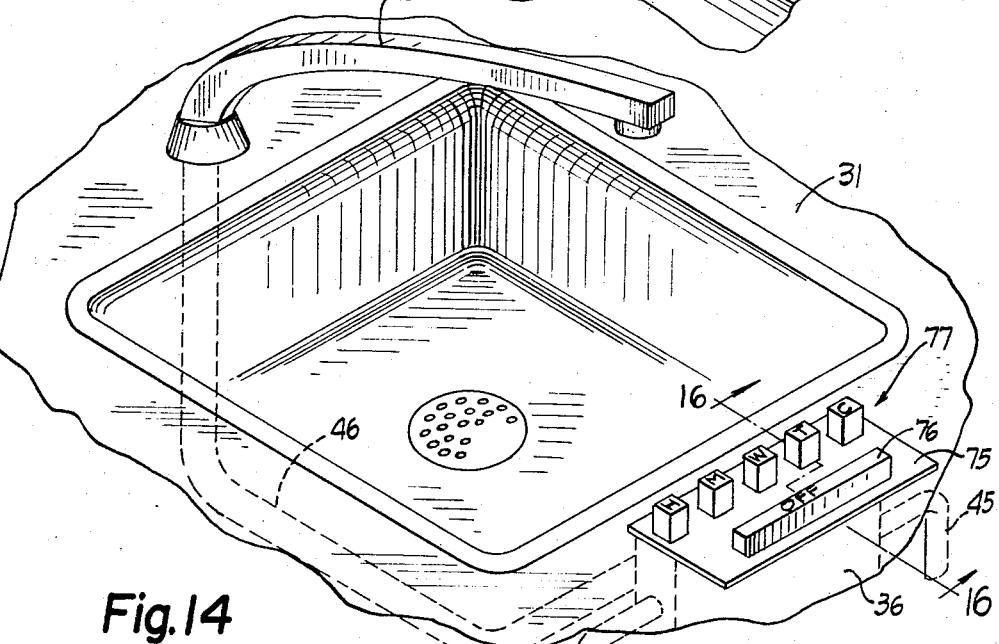
FIG. 14 is a perspective view of an alternate form of the device in which the push-button valve body is mounted flush at the front section of the sink top, with the water discharge faucet mounted at the rear section of the sink.

In a second embodiment, broadly indicated by numeral 77 in FIG. 14, wherein the valve is mounted flush at the forward edge of the sink top 31 with the discharge spout 49 positioned at the rear portion of the sink, the spout is connected by means of a pipe 46 either to 43 with 43a plugged or vice-versa. A third embodiment 78, illustrated in FIG. 15, employs tiltable actuating keys 80 rather than exposed push-buttons. Moreover, the valve pistons to be described are well suited for operation by solenoids, e.g., two-way solenoids, respectively aligned with and connected to the pistons for operation by remote switches. As all of these different installations employ the same fluid mixing valve unit 36 a description of this basic unit applies alike to all the types shown in the drawings.

Figure 4:
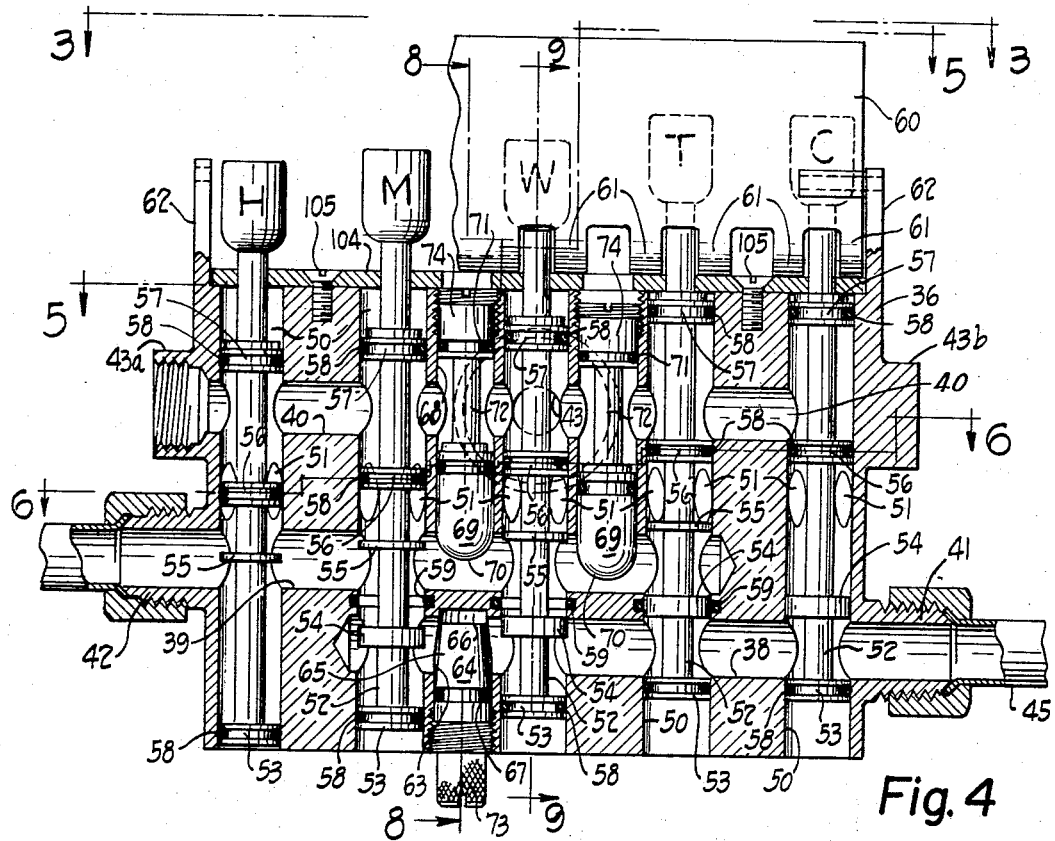
FIG. 4 is a vertical sectional view taken along the line 4—4 of FIG. 7.

The valve body 36, a casting made from a suitable non-corrodible metal, such as brass, has plurality of spaced and parallel straight valve piston bores 50 passing therethrough and open to the atmosphere at both ends, as is seen more clearly in FIG. 4, so that there can be no building up of air pressure in the bores 50 to resist movement of the valving pistons therein.

The number of bores 50 is determined by the number of different delivered mixtures desired in addition to straight hot or cold water; in the form illustrated, five bores to provide medium-hot water at M; warm water at W; and tepid water at T; as well as straight cold water at C and straight hot water at H.

Spaced and parallel hot and cold water inlet ducts 39 and 38 intersect at 90° the various bores 50, stopping short respectively of the bores 50 in which the straight cold water piston button C and the straight hot water piston button H are located. A discharge duct 40 is spaced upwardly from and parallel to the hot water inlet duct 39 and intersects all the bores 50 at 90° thereto.

Each bore 50 has four equi-spaced water-metering tapered slots 51 extending lengthwise in that wall portion thereof between the inlet duct 39 and the outlet duct 40, as is seen in FIGS. 4, 5, 6 and 10; the outline of the slots 51 shown roughly elliptical at the wall as produced by short blind holes drilled into the bore wall on respective axes downwardly divergent from, and intersecting at a common point in, the bore axis to provide at each a wall opening appreciably longer than the shift of the piston between its extreme operating positions. The region of the slots 51 defines a water metering chamber in the bores 50.

Figure 13:
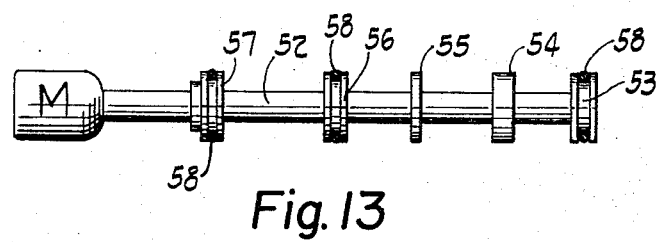
FIG. 13 is a side view of the medium-hot water-blending button piston.

The bores 50, in which the button pistons M, W, and T are disposed, have O-ring seal 59 seated in the walls thereof between the cold and hot water ducts 38 and 39, respectively, as is seen most clearly in FIG. 4. FIG. 13 illustrates the button piston M, whose construction is identical with that of button pistons W and T. Each of these structures has an elongated piston stem 52 with spaced piston discs, or heads 53, 54, 55, 56, and 57 of identical diameter, which slidably interfit the bores 50. Heads 53, 56 and 57 have O-ring seals 58 seated thereon in peripheral grooves. Head 55 is without a seal ring and when positioned or seated between the hot water inlet duct 39 and the metering chamber slots 51 as seen at T in FIG. 4, restricts but does not completely seal off the flow of water. The head 55 and head 54 are omitted from the cold water piston C and from the hot water piston H respectively.

Figure 8:
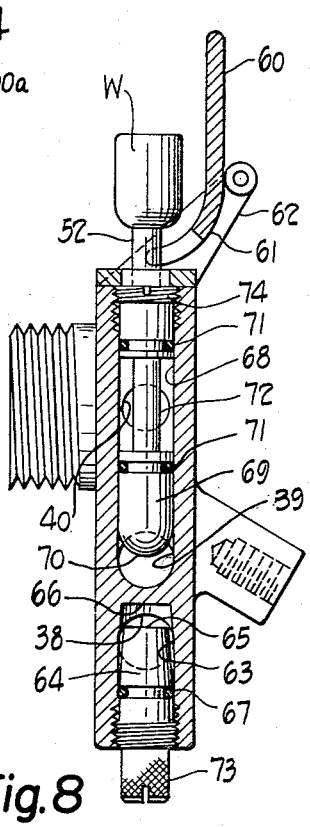
FIG. 8 is a vertical sectional view taken along the line 8—8 of FIG. 4.
Figure 9:
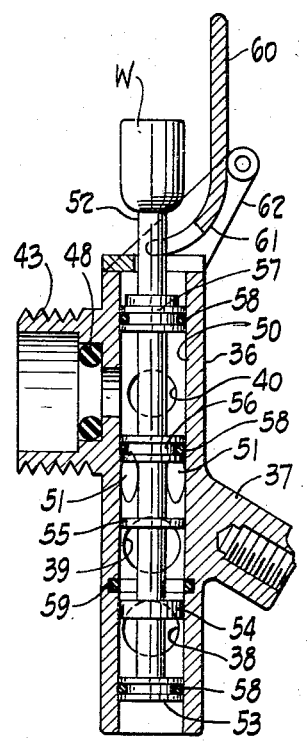
FIG. 9 is a vertical sectional view taken along the line 9—9 of FIG. 4.
Figure 10:
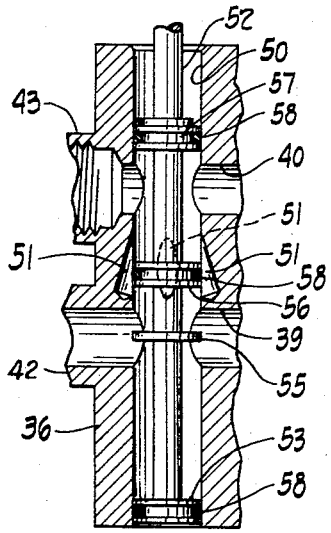
FIG. 10 is an oblique sectional view taken along the line 10—10 of FIG. 5.
Figures 11, 12:
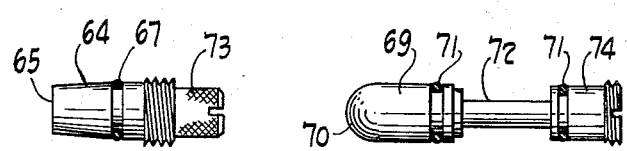
FIG. 11 is a side view of the cold water metering adjustment plug.
FIG. 12 is a side view of the hot water metering element.

A cold water metering plug 64, as seen in FIGS. 4 and 8, is threaded in a bore 63 intersecting the cold water inlet duct 38 between the bores 50 in which button pistons M and W are located. The plug 64 is frusto-conical in shape with a flat end surface 65 which approaches but never touches a flat surface 66 in the wall of duct 38. A water sealing O-ring seal element 67 is seated in the peripheral face of the plug, as is seen in FIG. 11. The frusto-conical shape of the plug 64 permits adjustment between full open to complete shut-off, if desired. The plug 64 is rotatable on its threads between adjusted positions cross-wise of the duct 38, by means of its screw end 73 which is knurled and also has a screw-driver slot.

Hot water metering plugs 69 (also see FIGS. 4 and 8) are threaded in bores 68 located between bores 50 of button pistons M and W, and W and T and intersecting hot water duct 39. The plugs 69, having ball tips 70 with the same radii as the duct 39, are mounted on stems 72 terminating in screw ends 74, whereby the depth of penetration of the plugs 69 may be adjusted by rotation of the screw 74 in the bore 68. The plugs have water sealing O-ring seal elements 71 mounted thereon, as is seen most clearly in FIG. 12.

Figure 5:
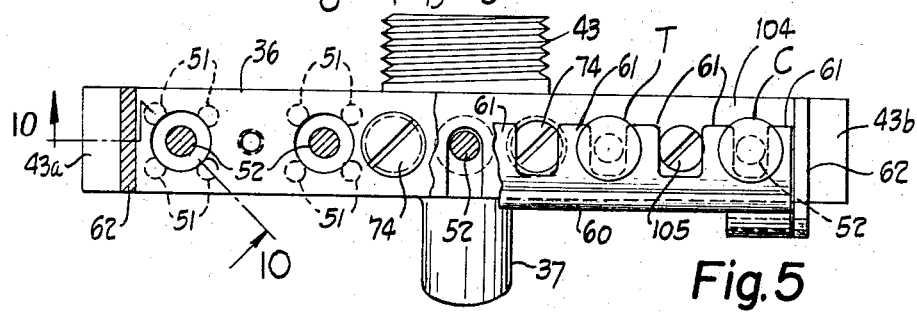
FIG. 5 is a partial section taken along the line 5—5 of FIG. 4.

The button pistons H, M, W, T and C are slidably inserted in their respective bores 50 and retained therein against removal by means of a slotted end plate 104 anchored on the body end 36 by means of screws 105, as seen in FIGS. 4 and 5, but are free to move longitudinally of the bores 50 without restraint.

Figure 2:
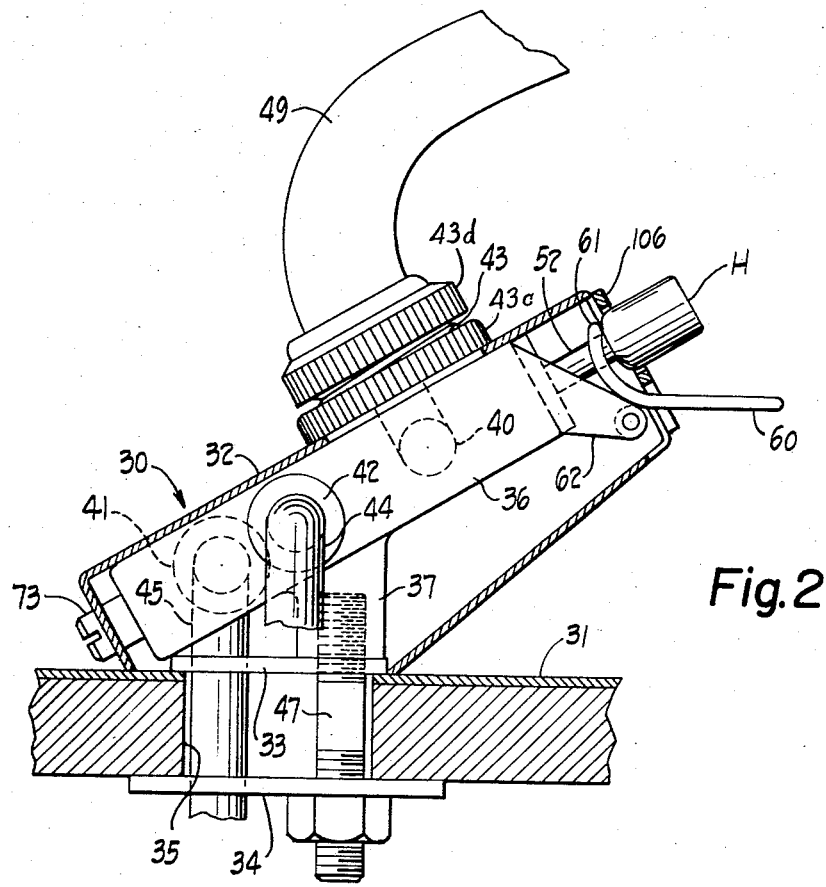
FIG. 2 is an irregular vertical sectional view thereof taken generally as indicated by the line 2—2 of FIG. 1, but showing the valve body in end elevation.
Figure 3:
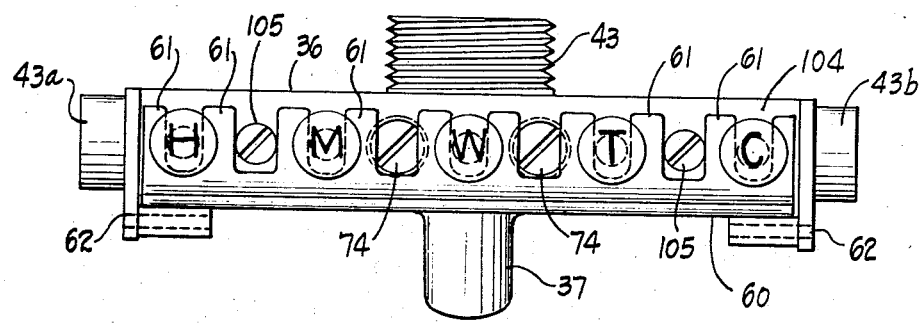
FIG. 3 is an edge view taken along the line 3—3 of FIG. 4.
Figure 7:
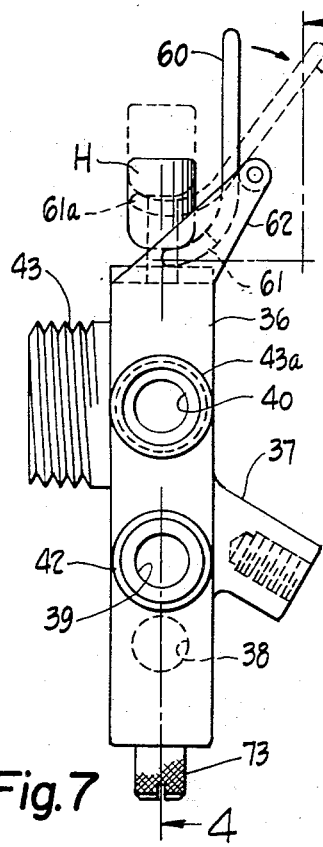
FIG. 7 is a left end view of the valve body shown in FIG. 4.

A shut-off plate 60, positioned across the front of the body 36 and pivotally mounted between end brackets 62, has fingers 61 fitting underneath the buttons H, M, W, T and C, as seen in FIGS. 2, 7, 8 and 9. When any valve button is in a depressed or open position, the plate 60 is tilted upward, as seen in FIG. 7. The buttons are raised to their closed positions by pressing down on the shut-off plate 60, thereby moving it to the position designated by reference numeral 60a in FIG. 7. A cover plate 106 is mounted across the front edge of the case 32 through which the valve buttons H, M, W, T and C protrude, as seen in FIGS. 1 and 2.

In the embodiment of the device 30, illustrated in FIGS. 1 and 2, the valve body 36 is mounted in its case 32 at a suitable angle on the sink top 31 over a hole 35, the latter accommodating the hot and cold water supply pipes 44 and 45 and covered by two clamping plates 33 and 34, by means of a nut on a stud bolt 47 threaded into an integrally cast body pedestal or base 37 and passing through the clamping plates. A free swinging and tilting discharge faucet 49 is mounted on top of the case 32 in connection with the discharge nipple 43 of the outlet duct 40 of the valve body 36, as is seen most clearly in FIG. 2. The hot and cold water supply pipes 44 and 45 are connected to the inlet duct nipple formations 42 and 41 by any suitable means, and in the preferred form shown in FIG. 4, comprise copper tubing having flared ends compressively sealed against the tapered nipple ends by coupling nuts.

In the following description of the operation of the valve 30 the various bores 50, in which the button valve units H, M, W, T and C are positioned, will be identified by reference characters 50H, 50M, 50W, 50T and 50C, respectively.

Depression of button H will provide straight hot water in bore 50H. Depression of button M will provide medium-hot water in bore 50M, composed of a mixture of hot water with a small amount of cold water, determined by adjustment of the metering plug 64 in the cold water duct 38. Depression of button W will provide warm water in bore 50W, composed of cold water with hot water added, in a proportion determined by adjustment of metering plug 69, just ahead of bore 50W, in the hot water inlet duct 39. Depression of button T will provide tepid water in bore 50T, composed of cold water with a smaller addition of hot water, determined by adjustment of metering plug 69, just ahead of bore 50T, in hot water inlet duct 39. Depression of button C will provide straight cold water in bore 50C. A study of FIGURE 4 will show that when the various pistons stems are in their depressed, water-delivering positions, mixing of hot and cold water occurs in the bores 50 between the heads 54, 55 and 56. Thus the metering chamber in the area of the slots 51 also serves as a final mixing chamber, as the hot and cold water flows therethrough. Furthermore, it will be apparent that, since all the piston heads or discs 53, 54, 55, 56 and 57 on the piston stems 52 are of the same diameter, they will have identical surface areas.

Thus, when button T is in the closed position shown, pressure from the cold water duct 38 in bore 50T is balanced between heads 53 and 54. At the same time pressure from the hot water inlet duct 39 in bore 50T is balanced between heads 54 and 56, since head 55 does not have a pressure sealing O-ring 58, but fits the bore 50T in a free sliding fit. As a consequence, the button valve piston T will remain stationary under hydrostatic balance.

At the same time the O-rings 58 on heads 53 and 57 prevent leakage of water through the open ends of bore 50T and also serve to balance the pressure on all pistons when the pistons are depressed and water is flowing.

When the valve buttons are moved to their partially or fully open positions, as seen at buttons M or H, the button pistons are hydrostatically balanced by pressure between the stem heads 53 and 57. Thus by providing spaced, slideably sealed end and intermediate heads 53, 54, 56 and 57, the valve button pistons H, M, W, T and C remain immovable wherever positioned longitudinally of their respective bores 50H, 50M, 50W, 50T and 50C, without the need of any special restraining devices, such as springs, threaded sections, or the like.

It will be further seen that when the valve pistons are in their closed positions as at T, there is no bypassing of water between the cold and hot water ducts 38 and 39 since the ducts are completely sealed off from each other by piston head 54.

As the buttons are moved downward from their closed positions, as at T, toward their fully open positions, as at H, the piston head 56 travels longitudinally of the bore 50 down the length of the gradually tapered slots 51, which meter the amount of water flowing past the head 56 into the outlet duct 40. This can be regulated between a slight trickle to the full volume of which the ducts 38 and 39 are capable of delivering, depending upon the amount the button is depressed.

The gasketless head 55 is so positioned on the piston stem 52 of valves M, W and T relative to the piston head 54 that both heads 55 and 54 provide the same size opening for the cold and hot water ducts 38 and 39, into the bores 50, at all times, as seen at 50W where the opening is just beginning, or at 50M where the valve is open to outlet duct 40. Thus, the same ratio of hot and cold water enters the mixing chamber at all times, whether only a trickle, or full volume, is being delivered. There is no sudden surge of either hot or cold water before the desired temperature is achieved. There is no difference in the temperature of the delivered water no matter what the rate of flow from the outlet duct 40 through the faucet 49.

Figure 6:
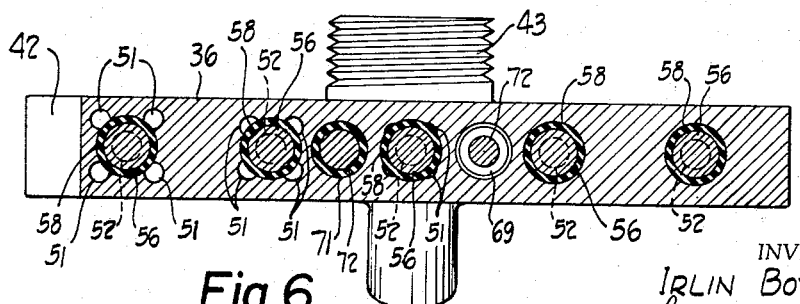
FIG. 6 is a cross-sectional view taken along the line 6—6 of FIG. 4.

The metering of the flow rate by reason of the movement of the flow metering head 56 relative to the tapered slots 51 can be better understood by referring to FIGURE 6, wherein the head 56 is in its closed position at button T; just at the opening point at button W; half open at button M; and fully open at button H. It will be seen that as the head 56 travels down the length of the tapered metering slots 51, more and more slot area is uncovered. Normally only one button is depressed at a time to obtain the desired water temperature, since the flow-rate or delivered volume for each predetermined temperature is governed by the amount the button is depressed. However, all the buttons can be depressed, if so desired. Hot and cold can be individually used to add either one to the other; or, by starting with C and leaving it depressed, T may be pressed to make the water warmer; W, M and H to make it hotter. The reverse can also be done, starting with H.

The gasketless disc 55 also serves to prevent a sudden surge of water into the outlet duct 40 before the sealing ring 58 of head 56 has cleared the top end of the metering slots 51, since its spacing from the head 56 is such that the disc 55 keeps the bore 50 blocked until the metering head 56 has moved down far enough to clear its ring 58. Thus the ring 58 is not pulled out of its seat by a sudden flow of water as the valve piston is first depressed.

While the inlet connections 41 and 42 of the cold and hot water ducts 38 and 39 are shown at opposite ends of the valve body 36, it is to be understood that such connections may be located anywhere, 360°, around the body, as long as the ducts 38 and 39 intersect the bores 50 at 90° to the long axes thereof, with the duct 38 entering between piston heads (in closed position) 53 and 54 of stems M, W, T and C; and with duct 39 intersecting between piston heads 54 and 55 (in closed position) of stems M, W and T, and between heads 53 and 55 of stem H.

The buttons are moved back to their normally closed position by pressing down on the shut-off plate 60.

It is to be understood that metering plugs 69 may also be given the tapered configuration of plug 64 if desired, or vice-versa, and that all of the plugs may be made adjustable from the same edge of the body 36 by suitable rearrangement of the parts.

While the shut-off plate 60 is shown as a single unit engaging all the buttons, it is to be understood that a plurality of shut-off plates may be provided; one for each button.

Figure 16:
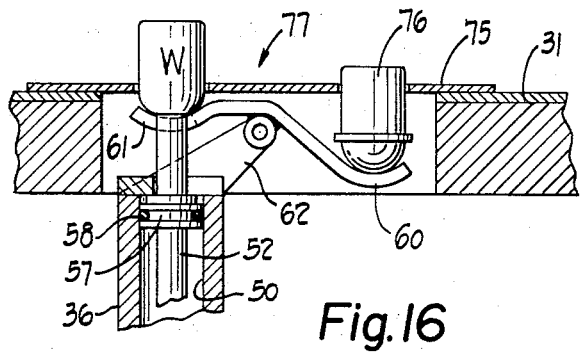
FIG. 16 is a vertical sectional view taken along the line 16—16 of FIG. 14, but showing the buttons with a round shape.

In the flush-mounted type of mixing valve 77 in FIGURES 14 and 16, the valve body 36, just described, is mounted below the sink top 31 and supported by a flat cover plate 75 having a vertical moving shut-off button 76 which bears against the shut-off plate 60, as is seen most clearly in FIGURE 16. The spout 49 is mounted at the back of the sink top 31 and connected to the outlet formation 43 by means of a pipe 46. This construction lends itself not only to the control of a remotely spaced sink faucet but can also be used to control shower heads and similarly remotely positioned discharge fixtures.

Figure 15:
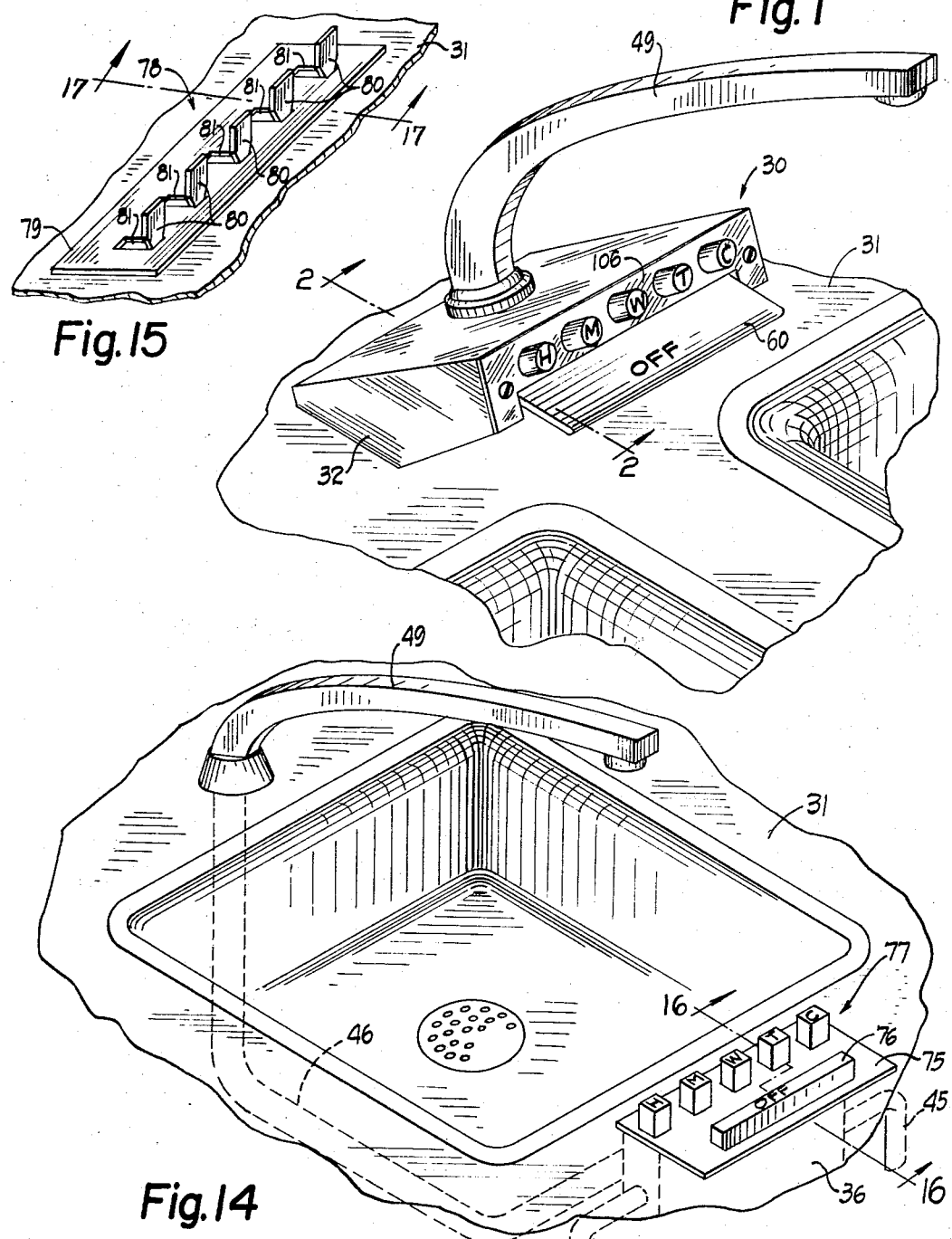
FIG. 15 is a perspecive view of a second alternate form in which tiltable keys are used to actuate the individual pistons.
Figure 17:
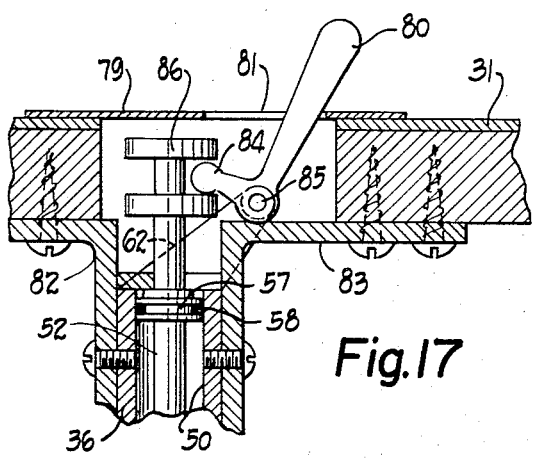
FIG. 17 is a vertical sectional view taken along the line 17—17 of FIG. 15, but showing a modification in the shape of the projecting portion of an operating key.

In the embodiment illustrated in FIGURES 15 and 17, tiltable keys 80 are used instead of push buttons to effect longitudinal movement of the piston stems 52. The valve body is mounted below the sink top 31 by bracket arms 82 and 83, and each operating button is replaced by a grooved head 86 engaged by a foot 84 on an operating lever or key 80, which is tiltably mounted on a rocker shaft 85. The unit cover plate 79 has a slot 81 at each key to permit movement of the key cross-wise of the shaft 85.

By providing a longitudinal slot (not illustrated) intersecting all the valve slots 81 in the cover plate 79, a single key may be used to actuate any one of the valve pistons by sliding the key along the slot on the shaft 85 to selectively engage individual piston buttons 86, as can be readily understood by those skilled in the art.

Figure 18:
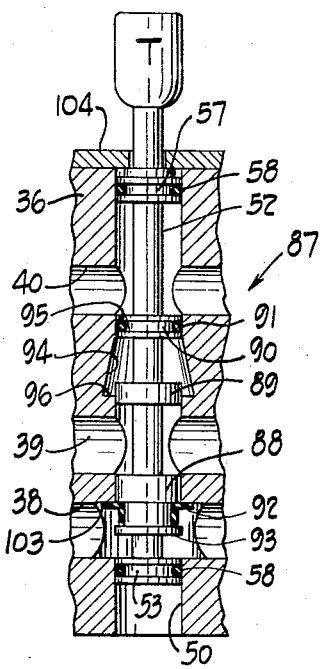
FIG. 18 is a sectional view of an alternate form of the valve having a frusto-conical mixing and metering chamber.

In an alternate form of valve construction illustrated in FIG. 18, the metering slots 51 are replaced in the bore 50 by a frusto-conical enlargement or chamber 94 having a short cylindrical valve seat 95 at its upper end to receive valve piston head 90 with its sealing ring element 91. The bottom end 96 of the chamber 94 is larger in diameter than the top end, so that as the piston head 90 is moved downward into the chamber 94 the flow of water to the discharge duct 40 increases proportionately and the O-ring 91 will have been released from its sealing engagement with the top wall of its groove in head 90 with the surrounding bore surface.

Figure 20:
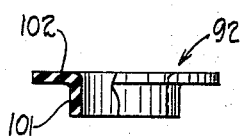
FIG. 20 is a side elevation and partial section of one of the T-ring seals used in the modifications of FIGS. 18 and 19.

A gasketless head 89 slidably fits the bore 50 for travel between the chamber 94 and the hot water inlet duct 39. Head 88 is positioned on the stem 52 between the hot water duct 39 and the cold water duct 38, and has a rubber T-ring sealing element 92, such as illustrated in FIG. 20, mounted immediately against the lower face thereof, with its flat top surface 102 aligned therewith and its vertical tubular or sleeve section 101 seated against a retaining ring 93 on the stem 52. The bore 50 is counter-bored at the top face of the cold water duct 38 to provide a flat seat 103 for the upper face 102 of the sealing element 92.

Since the head 88 fits the bore 50 in a sliding fit, the space between it and the bore wall, through which water pressure in duct 39 can bear against the top face of T-ring seal element 92, is minute, thereby exposing an infinitesimally small area of the top face of T-ring seal element 92, compared to the large bottom area, which is entirely exposed to the full water pressure from duct 38.

Since the total liquid force against a submerged plane is equal to the product of the pressure times the area, or proportional to the exposed area, a positive seal is assured when the valve stem 52 is in its closed position, preventing by-passing of hot and cold water between the ducts.

The gasketless head 89 is positioned on stem 52, as seen in FIGURE 18, so that by the time it is moved downward enough to un-block bore 50 for free flow of water from duct 39 into the mixing chamber 94, the gasket 91 of head 90 will have cleared the lower edge of seat 95. Thus the gasket 91 is not subjected to any dislodging forces by the sudden surge of water flowing from the mixing and metering chamber 94 into the discharge duct 40.

Figure 19:
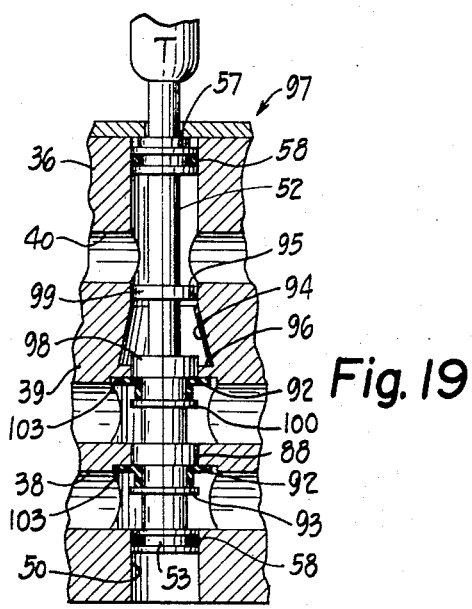
FIG. 19 shows a modification of the valve construction appearing in FIG. 18.

In FIGURE 19, a further modification in the valve, the metering head 99 at the top of chamber 94 is gasketless, while both heads 98 and 88 have T-ring gaskets 92. In this construction the position of head 99 with reference to head 98 is not critical, since head 99 has no sealing gasket to be dislodged by a surge of water at the instant of its separation from the metering seat 95. The lower T-ring gasket 92 prevents by-pass; the upper T-ring gasket prevents mixed or unmixed water flow to discharge duct 40. The head 99 meters the amount of flow, as it moves in the tapered chamber 94.

It will be evident that in all embodiments of the valve critical wear will occur only at the various rubber sealing gaskets, which can be easily replaced without the use of tools by merely removing the pistons from their bores and mounting new rubber gaskets on the various piston heads, and in the groove in bore wall 50 for gasket 59, in the type identified by reference numeral 30.

Since all of the valve pistons are always in hydrostatic balance, there are no retaining means present to complicate the removal and replacement of the pistons in the valve body 36.

It should also be noted that any number of discharge units may be controlled by this mixing valve through the use of a diverter connected to the outlet duct 40.

While the invention has been disclosed in preferred and alternate forms, it is to be understood that the specific embodiments thereof, as described and illustrated herein, are not to be considered in a limited sense, as there may be other forms or modifications of the invention which should also be construed to come within the scope of the appended claims.

I claim:

1. In a valve for metering fluid comprising a body member having at least one bore; said bore having at least one inlet, an outlet axially spaced from the inlet, and an integral chamber intermediate said inlet and outlet and of a cross section increasing in a direction away from said outlet and towards said inlet, a stem reciprocably movable axially within said bore and having a piston head fixed thereon and a resilient sealing member circumferentially disposed in a groove about said head, the outer diameter of said resilient sealing member normally greater than the diameter of the chamber adjacent the said inlet and lesser than the diameter of the chamber adjacent the outlet, whereby movement of the stem towards the outlet causes the said piston head and associated sealing member to seat sealingly at the outlet end of the integral chamber and prevent flow of fluid from said inlet to said outlet, and whereby stem movement towards the said inlet provides an increasing flow area past said head and allows a flow of fluid towards said outlet progressively greater with increasing displacement toward the inlet of the piston head with the stem; a second piston head on said stem spaced from the first piston head towards the said inlet, said inlet opening radially into said bore at a region spaced from said chamber, the spacing between said second and first piston heads being such that when the first piston head seats at the narrower outlet portion of the chamber the second piston is disposed in the bore adjacent the inlet end of said chamber, and the diameter of the second piston head being substantially equal to the diameter of the bore opposite the second piston head when the first piston head seals the outlet end of said chamber, the length of said second piston head relative to the spacing of said inlet from the chamber end adjacent thereto being such that said sealing member unseats before said second head moves to a position opening said chamber to said inlet.

2. A hot and cold water push-button mixing valve comprising: a body member having a first bore, a second bore and at least one intermediate bore, the body member having a first inlet duct intersecting said first bore and said intermediate bore, a second inlet duct spaced from the first inlet duct and intersecting said second bore and said intermediate bore, said second inlet duct being isolated from said first bore, an outlet duct spaced from the said inlet ducts and intersecting all the said bores, the wall of each bore having a graduated recess therein between said outlet duct and said respective inlet ducts defining a water mixing and metering chamber, a reciprocable piston stem in each of the piston bores, each said stem having a piston head thereon adapted sealingly to engage said graduated chamber adjacent one end thereof and seal the flow of water from said chamber to said outlet duct when said stem is moved in one direction and meter the flow of water from said chamber to said oulet duct when the stem is moved in the opposite direction.

3. A hot and cold water push-button mixing valve comprising in combination: a body member having a plurality of spaced and parallel piston bores therethrough, open to the atmosphere at their ends, one for each of respective pre-determined delivery temperatures including bores for straight hot water, for straight cold water, and for at least one mixed delivery; the body member also having a first, cold-water, inlet duct interconnecting all the piston bores, except the straight hot-water piston bore, intermediate their ends, and at right angles thereof; a second, hat-water, inlet duct spaced from the first inlet duct and intersecting all the piston bores, except the straight cold-water piston bore, intermediate their ends and at right angles thereto; and a third, outlet, duct spaced beyond the second inlet from the first inlet duct, intersecting all the piston bores, intermediate their ends at right angles thereto; the wall of each piston bore having a graduated recessed formation therein affording a flow cross section increasing along the bore, between the second duct and the outlet duct and defining a water metering chamber; a flow control plug adjustably mounted in each inlet duct adjacent selected piston bores for metering the volume of hot or cold water entering the selected piston bore from each inlet duct; a reciprocable valve piston stem in each piston bore, having an operating button at one end and a plurality of parallel piston heads of uniform diameter, larger than that of the stem, spaced on the length thereof and slidably interfitting the bore; the stem having two of said piston heads as non-valving heads positioned thereon proximate its ends respectively outwardly beyond all said ducts, a third one of said piston as a valving head positioned to seat between the water metering chamber and the outlet duct, and a fourth one of said piston heads as a valving head positioned to seat between one of the said inlet duct sand said metering chamber; each stem in a bore for mixed water delivery having a fifth piston head as a valving head positioned to seat between a second of said inlet ducts and said metering chamber; each piston stem being movable longitudinally of its bore, between a first position and a second position; said first position wherein the valving piston heads seal off communication in the bore between the metering chamber and the outlet and inlet ducts; said second position, wherein the valving piston heads are moved simultaneously to provide communication, in the bore, between the metering chamber, the inlet and the outlet ducts; the flow rate of fluid into the outlet duct being proportional to the longitudinal position of the third piston head in the metering chamber relative to its seat; and shut-off means on the body, engageable with the piston stem operating buttons, to move the piston stems from their second to their first position.

4. A hot and cold water push-button mixing valve as described in claim 3, wherein as said formation the wall of each piston bore having a plurality of circumferentially spaced, longitudinally extending, tapered slots therein, between the second inlet duct and the outlet duct, tapering inwardly from a point flush with the bore wall proximate the outlet duct.

5. A push-button mixing valve, as in claim 4, wherein the shut-off means comprises a pair of spaced and aligned end brackets mounted on the body member, a finger plate mounted between the brackets in front of the piston stem operating buttons and tiltable between a first, raised position and a second, depressed position; the plate having a plurality of fingers engageable with all the piston stem buttons; the plate being tilted upward to its first position, when any one of the piston stem buttons is depressed to its second, open position; the plate being operable to raise the piston stem buttons to their first, closed position, when tilted downward to its second, depressed position.

6. A hot and cold water push-button mixing valve as described in claim 4, wherein each piston stem has an O-ring seal mounted in the peripheral face of the first, second and third piston heads; an O-ring seal embedded in the wall of each piston bore intersected by both inlet ducts and located between the two inlet ducts, adapted to provide a sealing seat for one of said valving heads other than the third piston head.

7. A push-button mixing valve, as in claim 6, wherein the shut-off means comprises a pair of spaced and aligned end brackets mounted on the body member, a finger plate mounted between the brackets in front of the piston stem actuating buttons and tiltable between a first, raised position and a second, depressed position; the plate having a plurality of fingers engageable with all the piston stem buttons; the plate being tilted upward to its first position, when any one of the piston stem buttons is depressed to its second, open position; the plate being operable to raise the piston stem buttons to their first, closed position, when tilted downward to its second, depressed position.

8. A hot and cold water push-button mixing valve as described in claim 3 with each piston bore having a frusto-conical counterbore positioned between the second inlet duct and the outlet duct, with its smaller diameter proximate the outlet duct as said recessed formation; flat annular seats located in the first inlet duct at each of its intersections with a piston bore; an O-ring sealing element mounted in the peripheral face of the first, second and third piston heads; a T-ring sealing element mounted, on each piston stem entering the first inlet duct, against the lower face of one of valving heads other than the third piston head, adapted to seal against the respective annular seat of the first inlet duct.

9. A hot and cold water push-button mixing valve as described in claim 3 with each piston bore having a frusto-conical counter-bore positioned between the second inlet duct and the outlet duct with its smaller diameter proximate the outlet duct as said recessed formation; flat annular seats located in the first and second inlet ducts at each of their intersections with a piston bore; an O-ring sealing element mounted in the peripheral face of the first, second and third piston heads; T-ring sealing elements mounted on the piston stems, against the lower faces of the fourth and fifth piston heads, adapted to seal respectively against the annular seats in the first and second inlet ducts.

10. A push-button mixing valve, as in claim 9, wherein the actuating buttons have circumferential grooves and the shut-off means comprises a pair of spaced and aligned brackets mounted on the body with a shaft mounted therebetween in front of the piston stem actuating buttons and individual keys tiltably mounted on the shaft opposite each button, each key having a finger engaged in a respective button slot, the keys being tiltable toward and away from the buttons to reciprocate their associated piston stems between their first and second positions in the piston bores.

11. A push-button mixing valve as in claim 6, wherein the piston-actuating buttons have circumferential grooves and the shut-off means comprises: a pair of spaced and aligned brackets on the body with a shaft mounted therebetween in front of the piston actuating butttons; a cover plate mounted over the buttons and shaft having a longitudinal slot aligned parallel with the shaft and a plurality of laterally extending spaced button slots intersecting the longitudinal slot, each aligned with the center line of one of the buttons; and a single button acuating key tiltably and slidably mounted on the bracket shaft and extending through the cover plate longitudinal slot; said key having a foot portion detachably engageable with any one of the button grooves upon movement of the key longitudinally of the shaft into selected button slots the key being tiltable on the shaft toward and away from the engaged button to reciprocate its associated piston stem between its first and second position in the piston bore.

References Cited
UNITED STATES PATENTS 2,725,894 12/1955 Mamoli.
3,192,952 7/1965 Botnick.

OTHER REFERENCES

R. O. Parmely, Product Engineering, vol. 30, No. 25, pp. 102 and 103, Dec. 9, 1963, class 251, O-ring Digest.

WILLIAM F. O'DEA, *Primary Examiner.*

D. H. LAMBERT, *Assistant Examiner.*